(12) United States Patent
Renzi

(10) Patent No.: US 6,715,231 B2
(45) Date of Patent: Apr. 6, 2004

(54) PEST CONTROL DEVICE

(76) Inventor: Guy C. Renzi, 369-78th St., Brooklyn, NY (US) 11209

( * ) Notice: Subject to any disclaimer, the term of this patent is extended or adjusted under 35 U.S.C. 154(b) by 39 days.

(21) Appl. No.: 10/420,598

(22) Filed: Apr. 22, 2003

(65) Prior Publication Data

US 2003/0177688 A1 Sep. 25, 2003

Related U.S. Application Data

(62) Division of application No. 10/093,723, filed on Mar. 8, 2002, now Pat. No. 6,581,323.
(60) Provisional application No. 60/324,433, filed on Sep. 24, 2001.

(51) Int. Cl.⁷ .............................................. A01M 13/00
(52) U.S. Cl. .............................. 43/124; 43/1; 52/101; 40/427
(58) Field of Search ............................... 43/124, 1, 67, 43/65, 66; 119/481; 52/101; 114/221 R; 49/58, 50, 495.1; 40/427

(56) References Cited

U.S. PATENT DOCUMENTS

| | | | |
|---|---|---|---|
| 891,012 A | 6/1908 | Shepard | 210/131 |
| 934,469 A | 9/1909 | Shoup | 43/66 |
| 1,152,980 A | 9/1915 | Ryason | 43/65 |
| 1,335,359 A | 3/1920 | Beisel | 43/66 |
| 2,163,938 A | 6/1939 | Dickson | 33/561.1 |
| 2,777,171 A | 1/1957 | Burnside et al. | 52/101 |
| 2,888,716 A | 6/1959 | Kaufman | 52/101 |
| 2,949,674 A | 8/1960 | Wexler | 33/561.1 |
| 3,191,239 A | 6/1965 | Moore et al. | 52/101 |
| 3,736,583 A | 5/1973 | Smith et al. | 340/540 |
| 4,356,087 A | 10/1982 | Miles | 210/131 |
| 4,536,980 A | 8/1985 | Fleming | 40/427 |
| 4,654,989 A | 4/1987 | Fleming | 40/427 |
| 4,765,094 A * | 8/1988 | Gemmell | 49/475.1 |
| 5,465,532 A * | 11/1995 | Varin | 49/493.1 |
| 5,765,319 A | 6/1998 | Callaghan, Jr. | 52/101 |
| 5,771,627 A | 6/1998 | Mattson et al. | 43/100 |
| 5,796,620 A | 8/1998 | Laskowski et al. | 700/197 |
| 5,924,237 A | 7/1999 | Ives | 43/100 |
| 5,974,725 A | 11/1999 | Knight | 43/100 |
| 6,035,575 A | 3/2000 | Hilty | 43/100 |
| 6,158,165 A | 12/2000 | Wilson | 43/66 |
| 6,189,246 B1 | 2/2001 | Gorthala | 40/446 |
| 6,253,493 B1 * | 7/2001 | Sauve | 49/470 |
| 6,298,587 B1 | 10/2001 | Vollom | 40/427 |
| 6,581,323 B2 * | 6/2003 | Renzi | 43/124 |

FOREIGN PATENT DOCUMENTS

GB  2276901 A  10/1994  ............. E06B/9/06

* cited by examiner

Primary Examiner—Peter M. Poon
Assistant Examiner—Joan M. Olszewski
(74) Attorney, Agent, or Firm—Walter J. Tencza, Jr.

(57) ABSTRACT

A technique is provided for keeping rodents and other pests out of warehouses and other buildings. A pest control device or guard is provided which is attached or fixed near the bottom surface of a door, such as an overhead door. The pest control device can adjust to uneven ground surfaces so that a fence or guard is provided to prevent pests, such as rats from entering buildings. The pest control device may be comprised of first, second, and third brackets which are connected together and can be mounted to a door. The brackets may be L-shaped. A plurality of pins is connected to the first, second, and third brackets so that each of the plurality of pins can move with respect to the first, second, and third brackets.

15 Claims, 8 Drawing Sheets

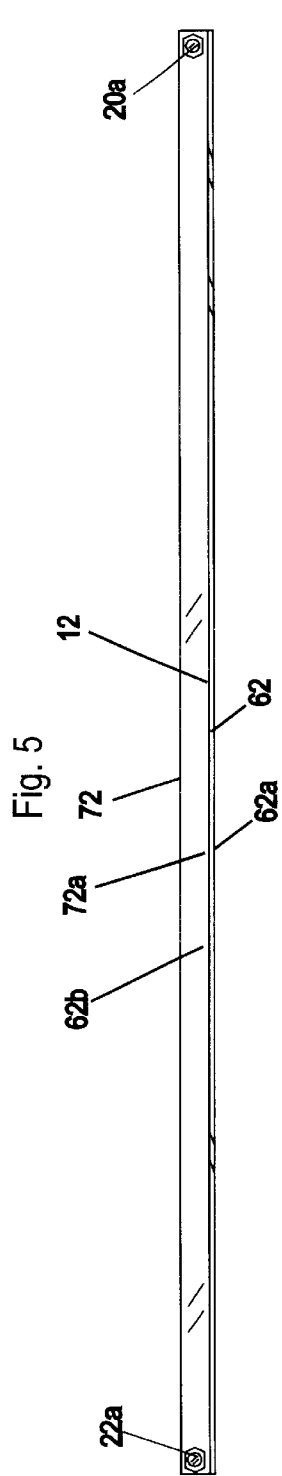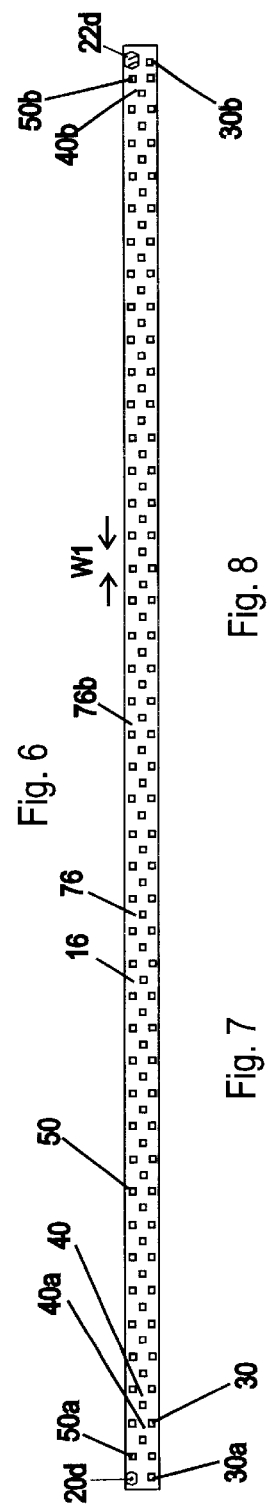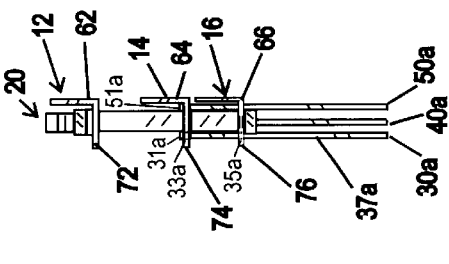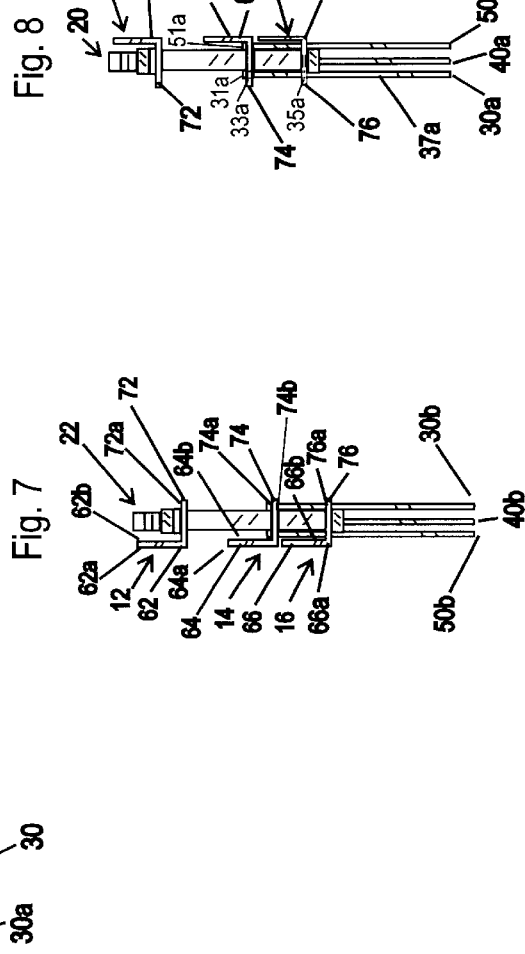

PEST CONTROL DEVICE

CROSS REFERENCE TO RELATED APPLICATIONS AND CLAIMS FOR PRIORITY

This application hereby claims the priority of and incorporates by reference U.S. Provisional Application No. 60/324,433 filed on Sep. 24, 2001, inventor Guy Renzi and this application is a divisional of and claims the priority of U.S. application Ser. No. 10/093,723, filed on Mar. 8, 2002 now U.S. Pat. No. 6,581,323, inventor Guy Renzi.

FIELD OF THE INVENTION

This invention relates to improved methods and apparatus concerning preventing pests from entering a building.

BACKGROUND OF THE INVENTION

Typically in the prior art a garage door or warehouse door protecting a building has a flat bottom surface. When the door is lowered the flat bottom surface comes in contact with a ground surface. If the ground surface is even, then the door prevents pests, such as rodents from coming into the building. However, particularly in a warehouse setting, the ground surface frequently becomes uneven due to, for example, the operation of heavy equipment such as forklifts. When the ground surface is uneven, the flat bottom surface of the garage or warehouse door does not contact all of the ground surface. This creates gaps through which a rodent can gain entry into the building. This is a particular problem in warehouses where food is stored and where it is particularly important to keep pests out.

SUMMARY OF THE INVENTION

The present invention provides a technique for keeping rodents and other pests out of warehouses and other buildings. In one embodiment a pest control device or guard is provided which is attached or fixed near the bottom surface of an overhead door. The pest control device can adjust to uneven ground surfaces so that a fence or guard is provided to prevent pests, such as rats from entering buildings.

In one embodiment the pest control device may be comprised of first, second, and third brackets. The brackets may be L-shaped. A plurality of pins is connected to the first, second, and third brackets so that each of the plurality of pins can move with respect to the first, second, and third brackets. The first bracket may prevent each of the plurality of pins from moving in a first direction beyond a first location and the second bracket may prevent each of the plurality of pins from moving in a second direction, which is opposite the first direction beyond a second location.

Each of the plurality of pins may be inserted through corresponding holes in the second and third brackets. The first bracket may be mounted near the bottom surface of a garage door. One or more of the brackets may be eliminated, so that for example one bracket may be provided or two brackets instead of three. Also one or more brackets may be replaced by plates or bars only, instead of L-shaped brackets.

The one or more brackets may be fixed to the door so that each of the plurality of pins is substantially perpendicular to the bottom surface of the door. The one or more brackets are typically fixed to each other by attachments devices which may comprised bolts, nuts, and spacers.

A method is also disclosed comprising the step of attaching a pest control device to a door. The pest control device may be of a form as previously described.

BRIEF DESCRIPTION OF THE DRAWINGS

FIG. 5 shows a top view of the pest control device;

FIG. 6 shows a bottom view of the pest control device;

FIG. 7 shows a right side view of the pest control device;

FIG. 8 shows a left side view of the pest control device;

DETAILED DESCRIPTION OF THE DRAWINGS

Figure 1:
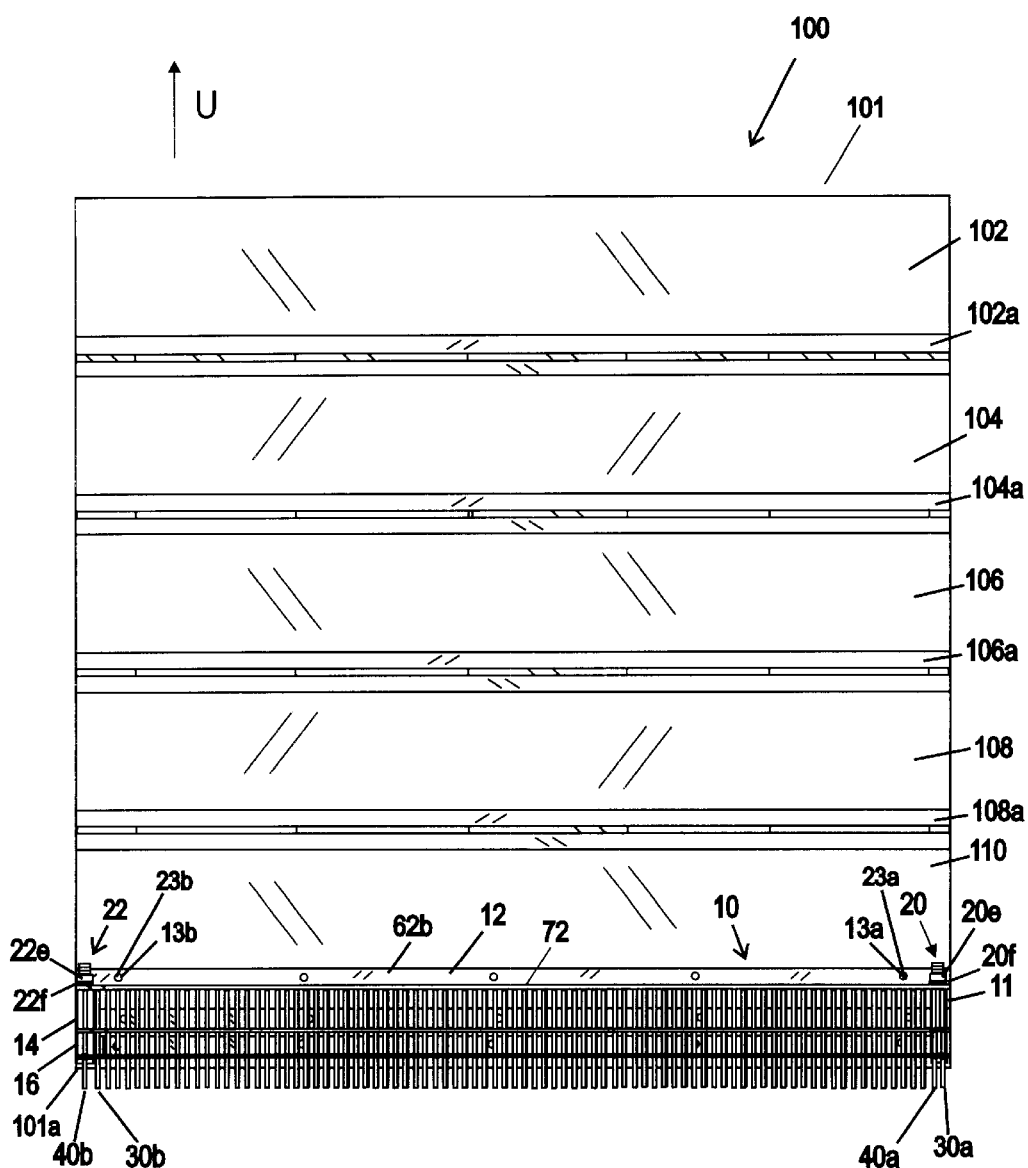
FIG. 1 shows a rear view of an apparatus including a pest control device attached to a door with the pest control device shown in a first state.
Figure 2:
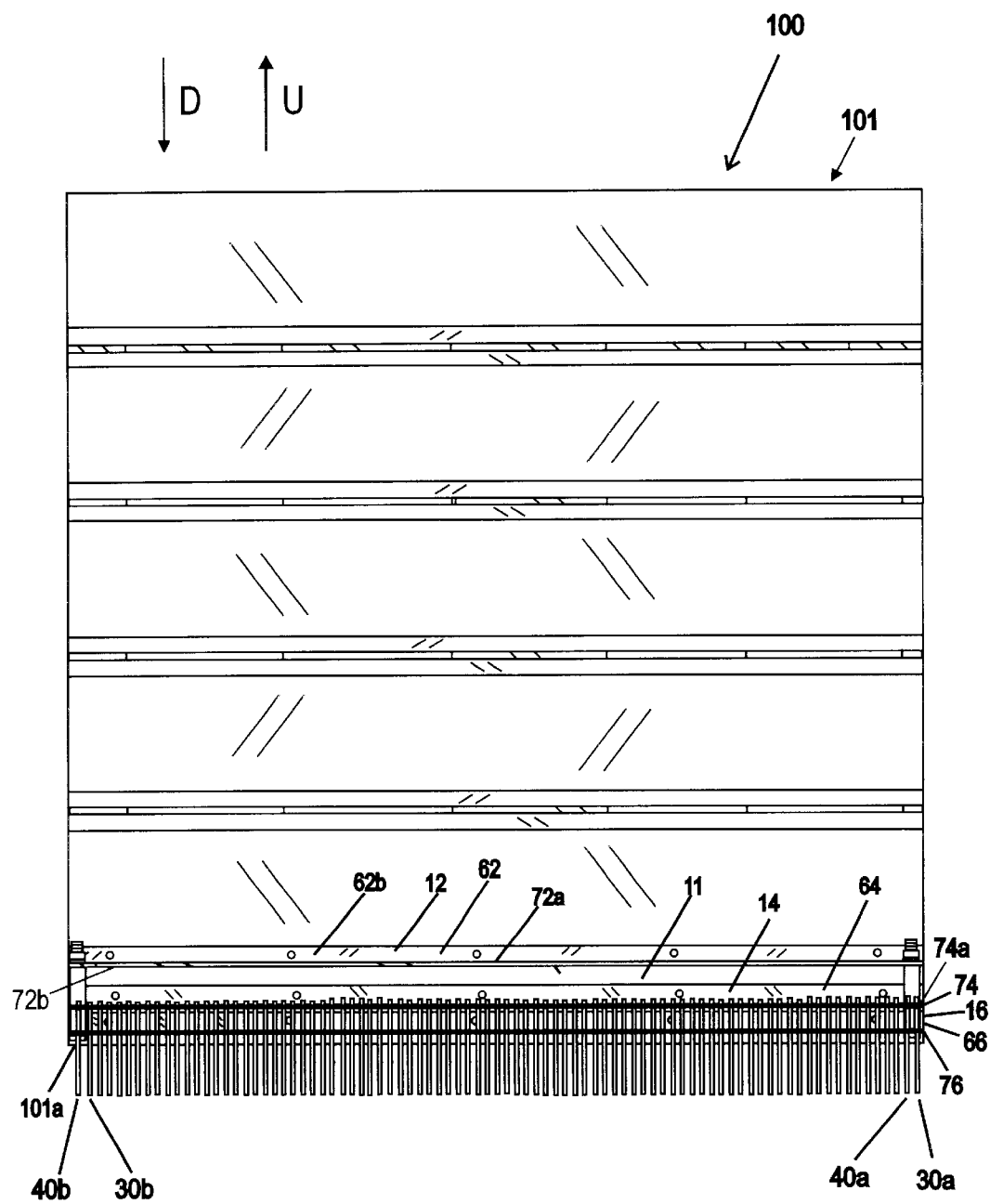
FIG. 2 shows rear view of the apparatus of FIG. 1 with the pest control device shown in a second state.
Figure 3:
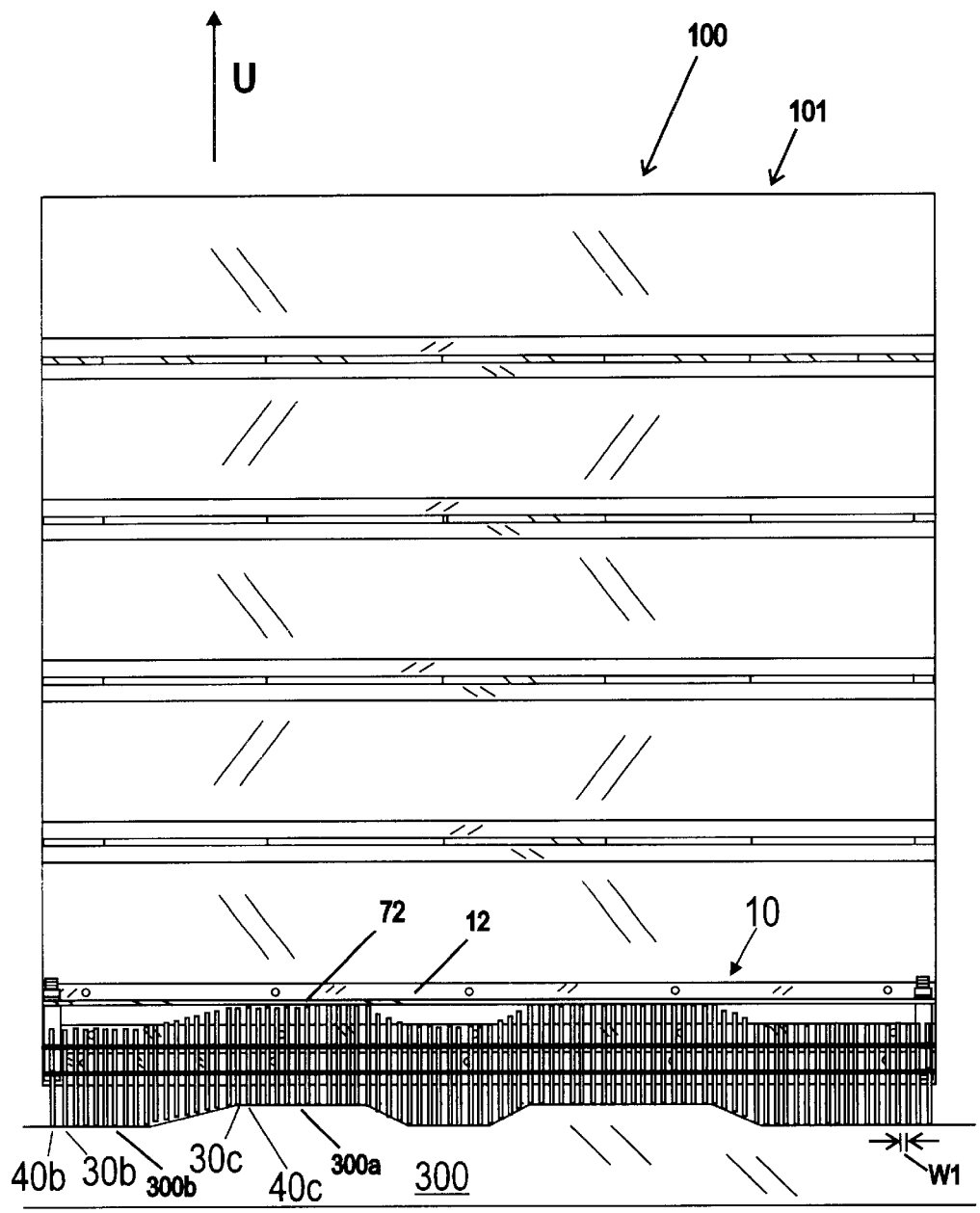
FIG. 3 shows a rear view of the apparatus of FIG. 1 with the pest control device shown in a third state (some up and some down, shown uneven surface)

FIG. 1 shows a rear view of an apparatus 100 including a pest control device 10 attached to a door 101 with the pest control device 10 shown in a first state. FIG. 2 shows a rear view of the apparatus 100 of FIG. 1 with the pest control device 10 shown in a second state. FIG. 3 shows a rear view of the apparatus 100 of FIG. 1 with the pest control device 10 shown in a third state.

The door 101 may be a conventional roll down door such as used in warehouses or garages. The door 101 may have a bottom surface 101a. The door 101 may be comprised of panels 102, 104, 106, 108, and 110. The panels may be connected by hinges. Panels 102 and 104 may be connected by hinge 102a. Panels 104 and 106 may be connected by hinge 104a. Panels 106 and 108 may be connected by hinge 106a. Panels 108 and 110 may be connected by hinge 108a.

Figure 4:
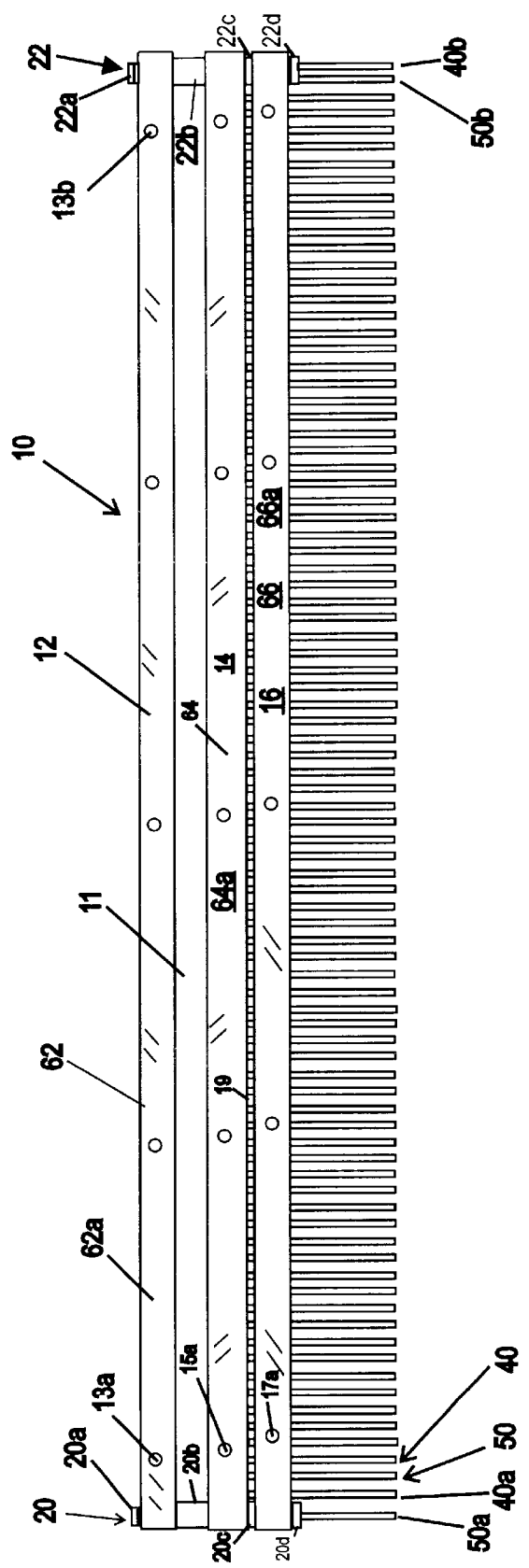
FIG. 4 shows a front view of the pest control device.

The pest control device 10 may be bolted, screwed, nailed, or fixed in any other way to the door 101. FIGS. 4, 5, 6, 7, and 8 front, top, bottom, right side, and left side views of the pest control device independent of the door 101. The pest control device 10 includes L-shaped brackets 12, 14, and 16, pins 30, 40, and 50, and attachment devices 20 and 22. There is a gap 11, between brackets 12 and 14 and a gap 19 between brackets 14 and 16, as shown in FIG. 4.

The L-shaped bracket 12 is comprised of plates 62 and 72, which are perpendicular to one another and are fixed together. The L-shaped bracket 14 is comprised of plates 64 and 74, which are perpendicular to one another and are fixed together. The L-shaped bracket 16 is comprised of plates 66 and 76, which are perpendicular to one another and are fixed together. The plates 62, 72, 64, 74, 66, and 76 are typically metal plates. Plates 62, 72, 64, 74, 66, and 76, have front and rear surfaces 62a–b, 72a–b, 64a–b, 74a–b, 66a–b, and 76a–b, respectively of brackets 14 and 16, respectively, are perforated and are each comprised of a plurality of holes. For each of pins 30, 40, and 50 there is a corresponding hole in plate 74 through which each pin passes and through which each pin can slide up in the direction U until each pin reaches a position shown in FIG. 1 and down in the direction D until each pin reaches a position shown in FIG. 2. One of these holes is hole 33a in plate 74, whose location is shown by dashed lines in FIG. 8 through which pin 30a can slide up and down. Similarly for each of pins 30, 40, and 50 there is a corresponding hole in plate 76 through which each pin passes and through which each pin can slide up in the direction U until each pin reaches a position shown in FIG. 1 and down in the direction D until each pin reaches a position shown in FIG. 2. One of these holes is hole 35a in plate 76, whose location is shown by dashed lines in FIG. 8 through which pin 30a can slide up and down.

The attachment device 20 is comprised of bolt 20a, spacer 20b, spacer 20c, hex nut 20e, and washer 20f. Similarly the attachment device 22 is comprised of bolt 22a, spacer 22b, spacer 22c, hex nut 22e, and washer 22f. The attachment devices 20 and 22 fix the brackets 12, 14, and 16 to each other.

The pins 30 include all the pins located in the row at the rear of the pest control device 10 as shown by FIGS. 1 and 6. As shown in FIGS. 1, 2, and 3, pins 30 would be located furthest away from the door 101. The pins 40 include all the pins in a middle row of the pest control device 10 as shown in FIG. 6. The pins 50 include all the pins located in a row near the front of the pest control device 10 as shown in FIGS. 4 and 6. Each of the pins is shown is inserted through holes in brackets 14 and 16. For example, pin 30a is inserted through hole 31a in bracket 14 and hole 35a in bracket 16. The locations of holes 31a and 35a are shown by dashed lines in FIG. 8. Each of the pins 30, 40, and 50 have a head which prevents them from falling through the brackets 14 and 16. For example pin 30a has a head 31a and pin 50a has a head 51a shown in FIG. 8.

The pins 30, 40, and 50 can be placed in a first state, such as shown in FIG. 1, so that all of the pins 30, 40, and 50 have their heads contacting the surface 72b of the plate 72 of the bracket 12. The pins 30, 40, and 50 cannot be moved any further upward in the direction U from this first state of FIG. 1.

The pins 30, 40, and 50 can be placed in a second state, such as shown in FIG. 2, so that all of the pins 30, 40, and 50 have their heads contacting the surface 74a of the plate 74 of the bracket 14. The pins 30, 40, and 50 cannot be moved any further downwards in the direction D from this second state of FIG. 2.

The pins 30, 40, and 50 can be placed in a variety of other states in between the first state and second state of FIGS. 1 and 2. Each pin may be placed in a different state. For example, pin 30a may be moved upwards until in a position as in FIG. 1, while pin 30b may be moved downwards until in a position as in FIG. 2. FIG. 3 shows a third state of the pest control device 10 where the pins have been placed in different positions. In the diagram of FIG. 3, an uneven ground surface 300 has caused the pins to be located in various positions.

In operation the pest control device 10 is bolted, screwed or fixed in some other manner to the door 101 as show in FIGS. 1, 2, and 3, through holes in brackets, 12, 14, and 16 such as holes 13b and 13a shown in FIG. 1. Screws 23b and 23a may be inserted through holes 13b and 13a, respectively, and screwed into door 101. The screws 23b and 23a may be termed an attachment device for attaching the pest control device 10 to the door 101. Each of the pins 30, 40, and 50 can move from the position shown in FIG. 1 to the position shown in FIG. 2 and anywhere in between. The door 101 is typically connected to a door lowering apparatus, not shown, known in the art for raising and lowering a warehouse roller door, or a garage door. The door 101 is lowered so that the pins 30, 40, and 50 come in contact with a ground or horizontal surface, such as surface 300. The surface 300 shown in FIG. 3 is uneven and has raised portions such as raised portion 300a and depressed portions such as depressed portion 300b.

Just before the pins 30, 40, and 50 come in contact with the surface 300 the pins are in the state shown in FIG. 2. I.e. all of the pins 30, 40, and 50 have their heads contacting surface 74a of plate 74 of bracket 14. The pins 30, 40, and 50 in FIG. 2 have fallen downwards in the direction D as far downwards as they can go. As the door 101 is lowered some of the pins 30, 40, and 50 begin to come in contact with portions of the surface 300. For example, pins 30c and 40c come into contact with raised portion 300a of the surface 300. This causes pins 30c and 40c to be pushed upwards in the direction U. The pins 30c and 40c are pushed upwards in the direction U either until they hit the plate 72 of the bracket 12 or until the door 101 has been lowered an acceptable distance.

Eventually the door 101 is lowered until other pins, such as pins 40b and 30b come in contact with the depressed portion 300b of the surface 300. The pins 40b and 30b will be pushed upwards in the direction U, but not as far upwards as the pins 30c and 40c, because of the uneven surface 300. The door 101 should be lowered until all the pins 30, 40, and 50 contact a portion of the surface 300. As shown by FIG. 3, because all of the pins 30, 40, and 50 contact a portion of the surface 300, a fence is created which prevents pests, such as rodents, from getting into a building. The spacing W1, shown in FIG. 6, between the adjacent pins in any of the rows of pins 30, 40, and 50 should be as small as possible and may be one quarter of an inch. The spacing between one pin of pins 30 and the closest pin of pins 40, such as between pins 30a and 40a in FIG. 4, should be much less due to the interleaving of rows of pins 30, 40, and 50. The spacing between pins 30a and 40 may be one eighth of any inch. The pins can be made of metal such as steel, iron, or aluminum or any other suitable material. The pins 30, 40, and 50 typically will be perpendicular or substantially perpendicular to the bottom surface 101a of the door 101.

A single bar or plate can be used instead of L shaped brackets 14 and 16. For example, plates 64 and 66 can be eliminated and perforated plates 74 and 76 can be used by themselves. The heads of each pin, such as the head 31a of the pin 30a in FIG. 8, are larger than the diameter of its corresponding holes such as holes 33a and 35a. The diameter of the body portion of each pin, such as body portion 37a of pin 30a is less than its corresponding holes such as holes 33a and 35a, which allows the pin 30a to slide within the holes 33a and 35a. The diameter of the body portion of each pin, such as body portion 37a of pin 30a, may be one-eighth of an inch and the diameter of the holes, such as holes 33a and 35a may be slightly greater than one-eighth of an inch.

Figure 9A:
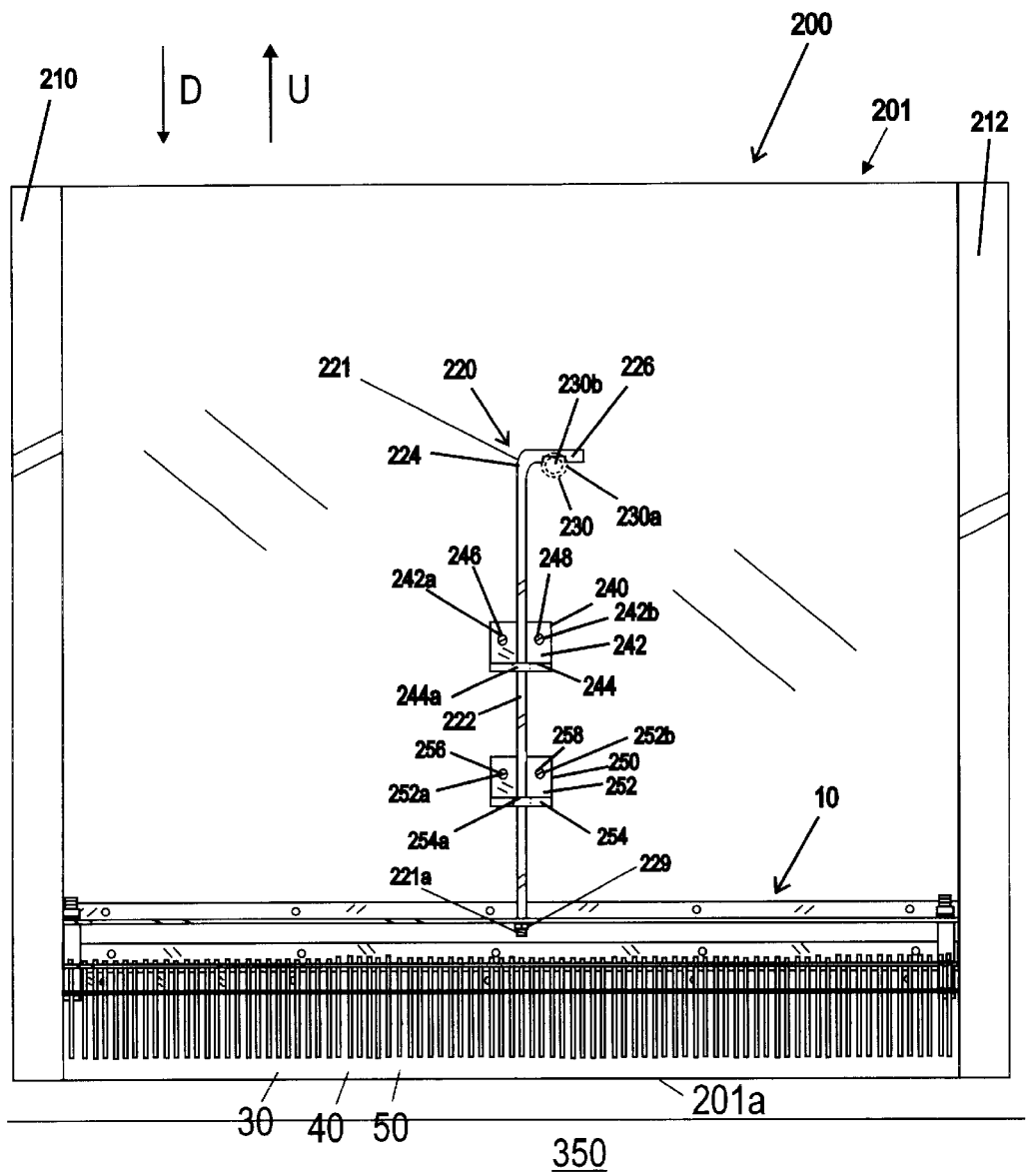
FIG. 9A shows a second embodiment of the present invention wherein a device for raising and lowering the pest control device is provided, with the pest control device in a raised position.
Figure 9B:
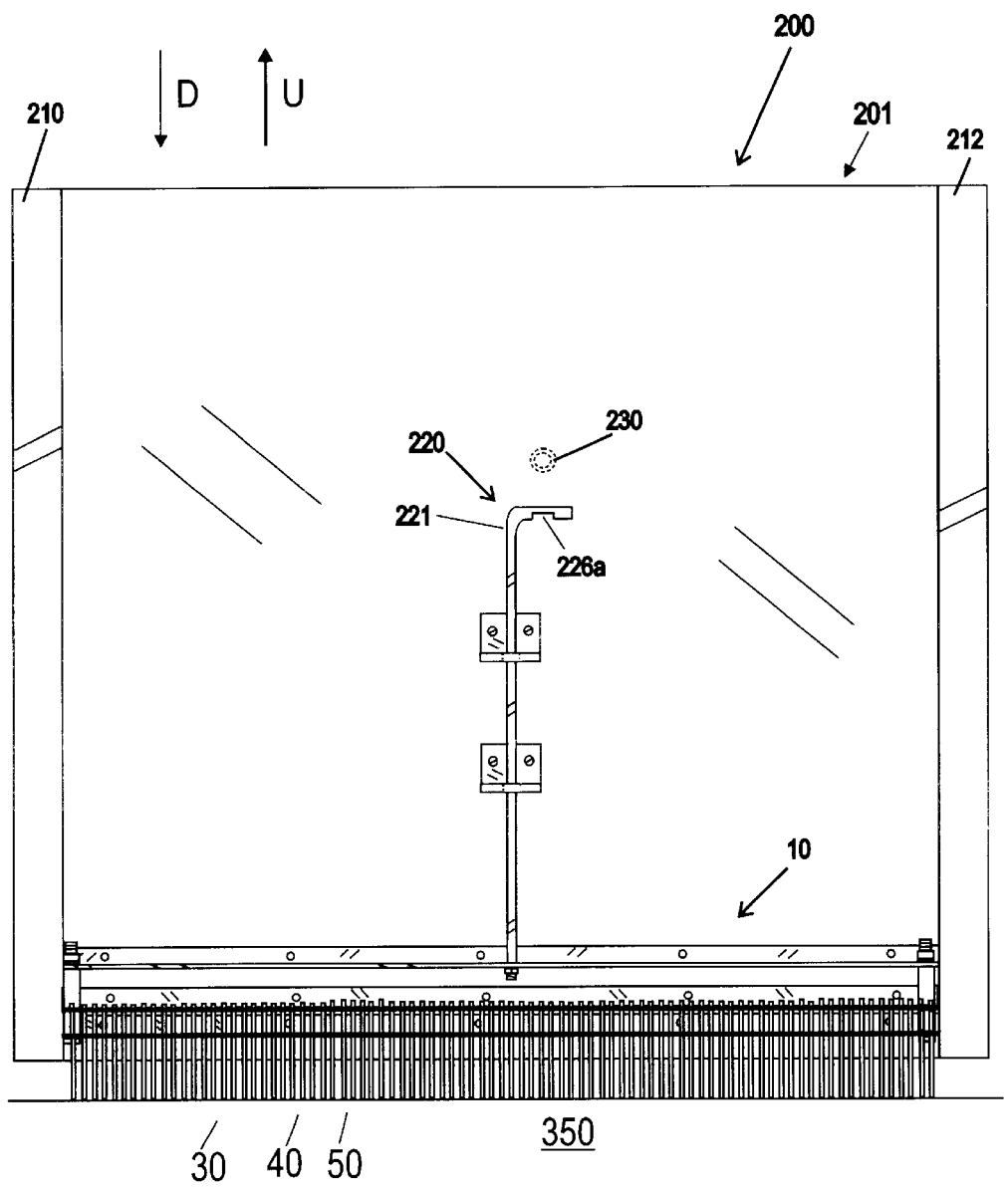
FIG. 9B shows the second embodiment of the present invention with the pest control device in a lowered position.

FIG. 9A shows an apparatus 200 in accordance with a second embodiment of the present invention wherein a device 220 for raising and lowering the pest control device 10 is provided, with the pest control device 10 shown in a raised position. FIG. 9B shows the second embodiment of the present invention with the pest control device 10 in a lowered position. The device 220 is particularly useful with a stiff, non roller door 201. The apparatus 200 is comprised of the door 201, door frames 210 and 212, device 220 and pest control device 10. The combination of the device 220 and the pest control device 10 can also be considered a pest control device in accordance with the present invention.

Figure 10:
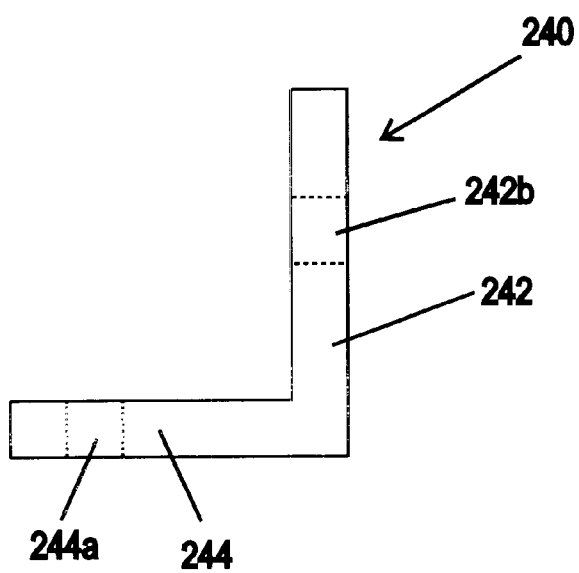
FIG. 10 shows a right side view of a bracket for use with the embodiment of FIGS. 9A and 9B.

The device 220 includes a curved or L-shaped pipe 221, a screw 230, and brackets 240 and 250. The L-shaped pipe 221 may be comprised of elongated portion 222, curved portion 224, and extension 226. The extension 226 may have a notch 226a shown in FIG. 9B. The bracket 240 may have a portion 242 and a portion 244, shown in FIG. 10, which may be perpendicular to each other. The portion 242 may have openings 242a and 242b and the portion 244 may have an opening 244a as shown by FIGS. 9A–B and 10. FIG. 10 is a right side view of the bracket 240. Screws 246 and 248 may be inserted through openings 242a and 242b, respectively, and screwed into the door 201 to mount the bracket 240 to the door 201. The elongated portion 222 of the L-shaped pipe 221 has a diameter smaller than the opening 244a in portion 244 to allow the elongated portion 222 to be inserted into the opening 244a of the portion 244 of the bracket 240 to allow the elongated portion 222 to slide up and down, in the directions U and D, within the opening 244a.

Similarly, the bracket 250 may be identical to the bracket 240 and may have a portion 252 and a portion 254, shown in FIGS. 9B and 9B, which may be perpendicular to each other. The portion 252 may have openings 252a and 252b and the portion 254 may have an opening 254a as shown by FIGS. 9A–B. Screws 256 and 258 may be inserted through openings 252a and 252b, respectively, and screwed into the door 201 to mount the bracket 250 to the door 201. The elongated portion 222 of the L-shaped pipe 221 has a diameter smaller than the opening 254a in portion 254 to allow the elongated portion 222 to be inserted into the opening 254a of the portion 254 of the bracket 250 and to allow the elongated portion 222 to slide up and down, in the directions U and D, within the opening 254a.

In operation the device 220 and the pest control device 10 can be placed in a raised position with respect to the door 201, as shown in FIG. 9A. In the raised position of FIG. 9A, the pest control device 210 remains above the bottom door surface 201a, and the pins 30, 40, and 50 of the pest control device 10 will not touch a ground surface 350. In the raised position of FIG. 1, the notch 226a is on top of the body portion 230b of the screw 230. The body portion 230b of the screw 230 prevents the L-shaped pipe 221 and the pest control device 10 from moving downwards in the direction D. The L-shaped pipe 221 is fixed at end 221a, which may be threaded, to the pest control device 10 by a nut 229.

The device 220 and the pest control device 10 can be placed in a lowered state by first slightly raising the L-shaped pipe 221 to take the extension 226 off of the screw 230. The L-shaped pipe 221 can then be rotated and then lowered, thus lowering the pest control device which is fixed to the L-shaped pipe 221. The device 220 and the pest control device 10 can be lowered until the pins 30, 40, and 50 contact the ground surface 350. The ground surface is shown as an even surface in FIG. 9B for simplicity of description, but in most cases the ground surface will be uneven as in FIG. 3.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. A method comprising the steps of attaching a pest control device to a door;

wherein the pest control device comprises
a first bracket; and
a plurality of pins connected to the first bracket so that each of the plurality of pins can move with respect to the first brackets;

wherein the step of attaching the pest control device to the door includes fixing the first bracket to the door so that each of the plurality of pins is substantially perpendicular to a bottom surface of the door; and wherein the plurality of pins can prevent a pest from passing underneath the bottom surface of the door.

2. The method of claim 1 wherein
the pest control device is attached to the door so that each of the plurality of pins extends beyond a bottom surface of the door.

3. The method of claim 2 wherein
the first bracket prevents each of the plurality of pins from moving in a first direction beyond a first location.

4. The method of claim 3 wherein
the pest control device further comprises
a second bracket wherein the second bracket prevents each of the plurality of pins from moving in a second direction beyond a second location; and
wherein the second direction is opposite the first direction.

5. The method of claim 2 wherein
the pest control device is attached to the door so that each of the plurality of pins is substantially perpendicular to the bottom surface of the door.

6. The method of claim 1 wherein
the first bracket is comprised of a first plate;
and wherein each of the plurality of pins is connected to the first plate of the first bracket so that each of the plurality of pins is substantially perpendicular to the first plate.

7. The method of claim 1 wherein
the pest control device is further comprised of a second bracket which is fixed to the first bracket;
the first bracket is comprised of a first plate;
the second bracket is comprised of a second plate;
and wherein each of the plurality of pins is connected to the first plate of the first bracket and to the second plate of the second bracket so that each of the plurality of pins is substantially perpendicular to the first plate and to the second plate.

8. The method of claim 1 wherein
each of the plurality of pins is connected to the first bracket by being inserted through a hole in the first bracket.

9. The method of claim 1 wherein
the first bracket is comprised of first and second plates which are substantially perpendicular to one another;
and wherein each of the plurality of pins is connected to the first bracket by being inserted through a hole in the first plate.

10. The method of claim 1 wherein
the plurality of pins are connected to the first bracket so that each of the plurality of pins can move with respect to the first bracket without rotating with respect to the first bracket.

11. The method of claim 1 wherein
the pest control device is attached to the door by fixing the first bracket to the door so that each of the plurality of pins is substantially perpendicular to a bottom surface of the door.

12. The method of claim 1 wherein
the pest control device is further comprised of a second bracket which is fixed to the first bracket;
the first bracket is comprised of a first plate;

the second bracket is comprised of a second plate;

and wherein each of the plurality of pins is connected to the first plate of the first bracket and to the second plate of the second bracket so that each of the plurality of pins is substantially perpendicular to the first plate and to the second plate.

13. The method of claim 1 wherein the pest control device is further comprised of a second bracket which is fixed to the first bracket;

wherein the first bracket is comprised of first and second plates which are substantially perpendicular to one another;

wherein the second bracket is comprised of third and fourth plates which are substantially perpendicular to one another;

wherein each of the plurality of pins is connected to the first bracket by being inserted through a hole in the first plate;

wherein each of the plurality of pins is prevented from moving in a first direction beyond a first location by the first plate of the first bracket; and each of the plurality of pins is prevented from moving in a second direction beyond a second location by the third plate of the second bracket; and wherein the first direction is substantially opposite the second direction.

14. The method of claim 1 further comprising raising the pest control device, wherein when the pest control device is raised, the first bracket is raised.

15. The method of claim 1 further comprising lowering the pest control device, wherein when the pest control device is lowered, the first bracket is lowered.

\* \* \* \* \*